US 8,238,565 B2

(12) United States Patent
Johannesson

(10) Patent No.: US 8,238,565 B2
(45) Date of Patent: Aug. 7, 2012

(54) SYSTEM AND METHOD FOR ADAPTING HEARING AIDS

(75) Inventor: Rene Burmand Johannesson, Hellerup (DK)

(73) Assignee: Oticon A/S, Smorum (DK)

( * ) Notice: Subject to any disclaimer, the term of this patent is extended or adjusted under 35 U.S.C. 154(b) by 1241 days.

(21) Appl. No.: 11/988,834

(22) PCT Filed: May 29, 2006

(86) PCT No.: PCT/EP2006/062665
§ 371 (c)(1),
(2), (4) Date: Jan. 15, 2008

(87) PCT Pub. No.: WO2006/128841
PCT Pub. Date: Dec. 7, 2006

(65) Prior Publication Data
US 2008/0232618 A1 Sep. 25, 2008

(30) Foreign Application Priority Data
Jun. 1, 2005 (EP) .................................... 05104731

(51) Int. Cl.
*H04R 29/00* (2006.01)
(52) U.S. Cl. .......... 381/60; 381/124; 381/312; 381/313; 381/314; 381/315; 381/316; 381/317; 381/318; 381/319; 381/320; 381/321; 381/322; 381/323; 381/324; 381/325; 381/326; 381/327; 381/328; 381/329; 381/330; 381/331; 600/559; 607/55; 700/118; 703/2; 29/896.2; 29/896.21
(58) Field of Classification Search .................. 381/124, 381/60, 312, 313, 314, 315, 316, 317, 318, 381/319, 320, 321, 322, 323, 324, 325, 326, 381/327, 328, 329, 330, 331; 600/559; 700/118; 607/55; 703/2; 29/896.21, 896.2
See application file for complete search history.

(56) References Cited

U.S. PATENT DOCUMENTS
2005/0088435 A1* 4/2005 Geng ............................ 345/419

FOREIGN PATENT DOCUMENTS
EP 1 246 506 A 10/2002

OTHER PUBLICATIONS
Soon Suck Jarng et al., "Directivity Pattern Optimization of Digital Hearing Aid by Boundary Element Method", [Online], Jun. 21, 2004.

(Continued)

*Primary Examiner* — Kenneth Parker
*Assistant Examiner* — David Chen
(74) *Attorney, Agent, or Firm* — Birch, Stewart, Kolasch & Birch, LLP

(57) ABSTRACT

A system for adapting a hearing aid to a user includes a unit generating an image of the user's ear together with a model of the hearing aid, wherein the model of the hearing aid in-situ includes a physical model of the hearing aid inserted in the user's ear prior to generating the image. The system also generates a mesh based on the image, calculates acoustic response to a simulated acoustic signal in the mesh, calculates a frequency response curve for a fixed position in the mesh, and identifies an optimal position of a microphone of the hearing aid in-situ from the acoustic response. They system also includes a comparator configured to compare the frequency response curve for the fixed position in the mesh with a maximum frequency response curve for the mesh stored by the system.

20 Claims, 3 Drawing Sheets

OTHER PUBLICATIONS

Walsh T et al., Journal of the Acoustical Society of America Acoust. Soc. America Through Aip USA, vol. 115, No. 3, Mar. 2004, pp. 1033-1043.

Bajaj C et al., Geometric Modeling and Proceedings, Jul. 10-12, 2002, Proceedings, pp. 73-82.

* cited by examiner

SYSTEM AND METHOD FOR ADAPTING HEARING AIDS

FIELD OF INVENTION

This invention relates to a system and a method for adapting a hearing aid, such as an in-the-ear (ITE) in-the-canal (ITC), or completely-in-canal (CIC) hearing aid, to a user.

BACKGROUND OF INVENTION

The development and manufacture of hearing aids generally utilises an average ear response for optimizing the functionality of the hearing aid. However, investigations, such as described in "Earphone pressure response in ear couplers", Technical Report TR-7 presented at the 83$^{rd}$ meeting of the Acoustical Society of America, 21 Apr. 1972, by R. M. Sachs and M. D. Buckhard, have shown big individual deviations from the average, which consequently will affect the adaptation of the hearing aid to the user.

The Audio Engineering Society's "Convention Paper 5753" presented at the 114$^{th}$ convention 22-25 Mar. 2003 Amsterdam, Netherlands, by Carl Hetherington and Anthony I. Tew describe how the pinna shape may be parameterized for the estimation of head-related acoustic transfer functions. This article discloses means for scanning a pinna shape (by CT scanning or by camera) and means for calculating sound pressure response of at an eardrum.

Further, in Journal of the Acoustical Society of America November 2002, volume 112, issue 5, the article "Measurement and numerical simulation of the changes in the open-loop transfer function in hearing aid as a function telephone handset proximity" by Gilles A. Daigle and Michael R. Stinson explains the use of boundary element method (BEM) for determining the open loop transfer function in hearing aids and how, for example, a telephone handset affects the open loop transfer function.

Neither of these presentations, however, provides means for adapting a hearing aid in accordance with a user's individual physical ear-shape or individual acoustic response of said ear-shape.

SUMMARY OF THE INVENTION

An object of the present invention is to provide a system and method for recording physical characteristics data about a user's ear-shape and utilizing said data for adapting a hearing aid to said user.

A particular advantage of the present invention is the provision of an optimizing means for pinpointing optimal placement of a microphone on a hearing aid in position in the ear of a user.

The above object and advantage together with numerous other objects, advantages and features, which will become evident from below detailed description, are obtained according to a first aspect of the present invention by a system for adapting a hearing aid to a user and comprising means for generating an image of said user's ear together with a model of said hearing aid, means for generating a mesh based on said image, means for calculating acoustic response to a simulated acoustic signal in said mesh, and means for identifying optimal position of microphone of said hearing aid in-situ from said acoustic response.

The system according to the first aspect of the present invention provides means for further customizing a hearing aid to a user so as to further improve the functionality of the hearing aid to a specific user. Thus the quality of the hearing aid perceived by the user is significantly improved.

The system according to the first aspect of the present invention may further comprise storing means adapted to store said image, acoustic response in said mesh, optimum position of said microphone, and/or a user's audiogram. The storing means enables a dispenser to recall any acoustic response for further calculations or re-calculations.

The term "dispenser" is in this context to be construed as a hearing care professional, such as a medical doctor, audiologist, or a hearing care trained person.

The term "audiogram" is in this context to be construed as a curve or curves describing the user's maximum tolerable sound pressure level as well as lowest identifiable sound pressure level as a function of frequency for right and left ears.

In addition, the term "a" or "an" is in this context to be construed as one or more, that is, a single or a plurality of elements.

The means for generating an image may comprise a camera or scanner, such as including a light sensitive integrated circuit, to record a picture of the user's ear. The means for generating may thus effectively be implemented by a digital camera, such as a CCD camera or scanner. Hence the image is appropriately configured to easy provide basis for generating a mesh.

The model of said hearing aid in-situ according to the first aspect of the present invention may comprise a virtual model of said hearing aid, a physical model of the hearing aid inserted in the user's ear prior to generating said image, or any combination thereof. The virtual model or physical model may be stored in the storing means. Hence the user may appear at the dispenser and have a digital photo taken of his ear, which is transmitted to the manufacturer of the hearing aid. The manufacturer, subsequently, may incorporate a virtual model of the hearing aid into the digital photo thereby recording an image of the hearing aid in-situ. Hence the means for generating the image may be adapted to position the virtual model of the hearing aid in the picture of the user's ear and generate the image thereby.

Alternatively, the dispenser may provide a physical model into the ear of the user and take a digital photo of the user's ear with the physical model in position, thus in fact recording an image at the dispenser.

The image according to the first aspect of the present invention may comprise a three-dimensional model of outer ear with a hearing aid inserted in the ear-canal. The three-dimensional model provides the basis for generating a three-dimensional mesh and to perform a numerical analysis of the acoustic response of a sound.

Hence the mesh may be established from an image of the user's ear without the hearing aid in-situ together with a, subsequently, incorporated virtual or physical model of the hearing aid. Thus the image may be recorded at one location, for example, at the dispenser, while the adaptation or optimization of the hearing aid relative to the user's ear is performed at the manufacturer.

The means for generating a mesh according to the first aspect of the present invention may comprise a numerical meshing engine. The numerical meshing engine may relate to a wide variety of numerical analysis tools known to a skilled person, such as for example a boundary element method, a finite element method, and optimisations thereof. Hence the means for calculating acoustic response may be adapted to utilize any of the numerical methods known to a skilled person.

The simulated acoustic signal according to the first aspect of the present invention may comprise a plurality of frequencies having a plurality of sound pressure levels. The means for calculating acoustic response may therefore present a picture of frequency response of the user's ear with the hearing aid in-situ. Further, the means for calculating acoustic response may further be adapted to calculate a frequency response curve for a fixed position in the mesh. The frequency response curve may be normalized relative to a low frequency sound pressure level (e.g. sound pressure level at 100 Hz) or even relative to sound pressure level of simulated acoustic signal.

The means for identifying optimal position of the microphone according to the first aspect of the present invention may comprise comparator means adapted to compare the frequency response curve for the fixed position in the mesh with a maximum frequency response curve for the mesh stored in storing means, and adapted to replace the maximum frequency response curve with the frequency response curve for the fixed position when the frequency response curve for the fixed position is greater than the maximum frequency response curve. Hence the optimal in-situ position of the microphone of the hearing aid may be simulated and therefore the adaptation of the hearing aid to physical characteristics of the user is improved.

The frequency response curve according to the first aspect of the present invention may comprise a microphone location effect (MLE) curve. The maximum of the MLE curve may be determined by integrating the MLE curve in a predefined frequency band.

The above objects, advantages, and features together with numerous other objects, advantages and features, which will become evident from below detailed description, are obtained according to a second aspect of the present invention by a method for adapting a hearing aid to a user and comprising:

(a) recording an image of said user's ear together with a model of said hearing aid in-situ,
(b) generating a mesh based on said image,
(c) calculating acoustic response to a simulated acoustic signal in said mesh, and
(d) identifying optimal position of microphone of said hearing aid in-situ from said acoustic response.

The method according to the second aspect of the present invention may incorporate any features of the system according to the first aspect of the present invention.

The above objects, advantages, and features together with numerous other objects, advantages and features, which will become evident from below detailed description, are obtained according to a third aspect of the present invention by a computer program to be executed on a processor unit and comprising actions of the method according to the second aspect of the present invention.

The computer program according to the third aspect of the present invention may incorporate any features of the system according to the first aspect and the method according to the second aspect of the present invention.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawing, wherein.

DETAILED DESCRIPTION OF PREFERRED EMBODIMENTS

In the following description of the various embodiments, reference is made to the accompanying figures, which show by way of illustration how the invention may be practiced. It is to be understood that other embodiments may be utilized and structural and functional modifications may be made without departing from the scope of the present invention.

Figure 1:
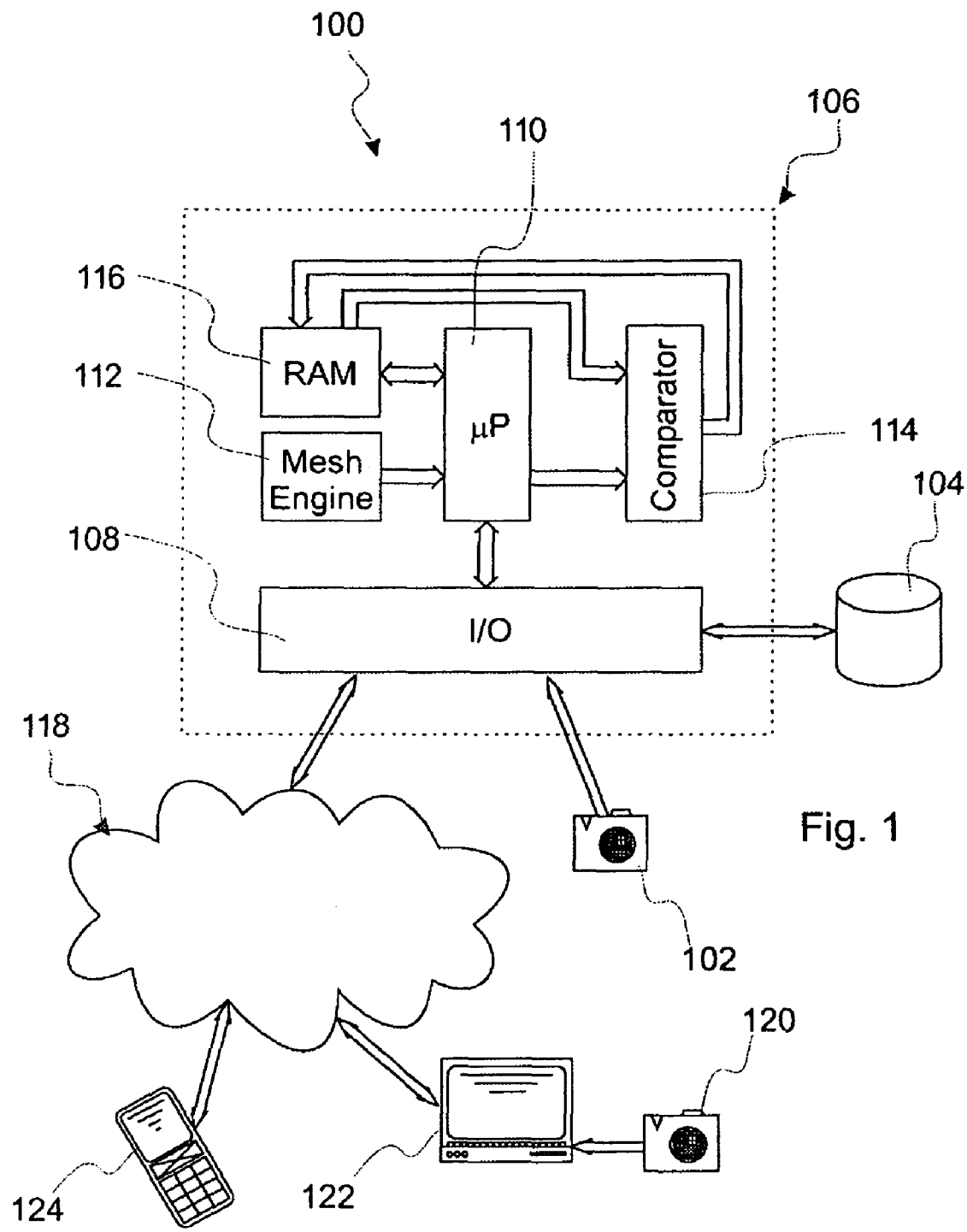
FIG. 1, shows a system according to a first embodiment of the present invention.

FIG. 1 shows a system for adapting a hearing aid to a user, which system is designated in entirety by reference numeral 100. The system 100 comprises a camera 102 for generating a digital picture of outer ear of a user of a hearing aid, a storage device 104 for storing the picture of the outer ear and model data of the hearing aid to be used by the user, and an analysis device 106 for performing a numerical analysis of the acoustic response of the ear with the hearing aid.

The camera 102 is according to the first embodiment of the present embodiment implemented by a digital camera, however; the camera 102 may in alternative embodiments be replaced by any scanning devices for generating digital images known to persons skilled in the art.

The camera 102 may be used both for taking a picture of the outer ear of the user as well as for taking pictures of potential hearing aids, which may be used by the user. For example, a dispenser takes a picture of both outer ears of a client and transmits the pictures to the manufacturer of the hearing aids together with information regarding which hearing aid product the client desires. The models of the hearing aids stored in the storage device 104 may be generated by the camera 102 and downloaded to the storage device 104.

The storage device 104 comprises non-volatile memory for digitally storing a wide variety of data. For example, the storage device 104 stores a database of users for whom hearing aids are to be manufactured and adapted. Audiograms and scans or photographs constituting pictures of outer ears are associated with each user in the database. In addition, the storage device 104 stores a database for hearing aid products available to the users, which products are associated with models to be adapted to the users.

The analysis device 106 utilises information received from the camera 102 as well as information stored in the storage device 104 for performing the optimum adaptation of a hearing aid to the user. The analysis device 106 comprises an input/output (I/O) unit 108 interconnecting the camera 102 and the storage device 104. The I/O unit 108 serves as an interface for a processor 110 of the analysis device 106. Thus data communicated from the storage device 104 or camera 102 to the I/O unit 108 is made available to the processor 110.

Subsequent to receiving the picture of the outer ear the processor 110 composes a three-dimensional image from the picture of the outer ear together with a desired hearing aid placed in the ear canal of the user. Alternatively, the dispenser has a series of physical models of the hearing aids which may be fitted into the user's ear before a picture is taken by the camera 102. Hence in an alternative embodiment of the present invention the dispenser provides a photograph of the outer ear of the user with a hearing aid.

In the first embodiment of the present invention, however, the dispenser takes a picture of the outer ear of the user without having hearing aids placed in the ear canal.

The processor 110 thus composes the image from the picture of the outer ear together with a digital representation of the desired hearing aid. The digital representation or model of the hearing aid may be based on a photograph or scan of the hearing aids or may be based on a computer aided design or manufacturing (CAD/CAM) file. The processor 110 forwards the image to a mesh engine 112 generating a three-dimensional mesh of the outer ear having the desired hearing aid, such as an ITE, ITC or CIC hearing aid, positioned in the ear canal.

The mesh generated by the mesh engine 112 is used for performing a numerical calculation of the acoustic response of the outer ear having the desired hearing aid positioned in the ear canal. The numerical calculation according to the first embodiment of the present invention is based on a boundary element method (BEM) and variants thereof. However, the numerical calculation may be based on any numerical analysis method known to a person skilled in the art, such as finite element or finite difference methods.

The numerical calculation of the processor 110 is based on an acoustic signal comprising one or more frequencies propagating against the outer ear. The processor 110 calculates a sound pressure level for each element, which may be normalized relative to the acoustic signal. The processor 110 thus calculates a series of graphs of sound pressure level as a function of frequency and angle of incidence. Following the calculation of the acoustic response of the outer ear having the hearing aid positioned in the ear canal, the processor initiates an optimisation process for identifying a position for the microphone of the hearing aid wherein the sound pressure level fulfills the requirements of the user. The processor 110 thus forwards each of the potential positions of the microphone to a comparator unit 114 comparing each of the graphs of the sound pressure level versus frequency with a desired profile stored in the local memory 116 of the analysis device. The local memory 116 may be implemented as a volatile and non-volatile memory.

The I/O unit 108 further connects to a communication network 118, which may comprise a computer network, television network, telecommunication network, or any combination thereof.

The communication network 118 enables a dispenser to take a picture of the outer ear with the use of a camera 120 in his office. The dispenser may connect this camera 120 to his computer 122 and directly communicate the picture of the outer ear from his computer to a manufacturer through the communication network 118 together with information regarding type of hearing aid product the client desires and information regarding hearing impairment.

The dispenser may in fact utilise a mobile or cellular telephone 124 having a digital camera to generate the picture and forward the picture to the manufacture as a multimedia services (MMS) message together with information regarding desired hearing aid.

Figure 2:
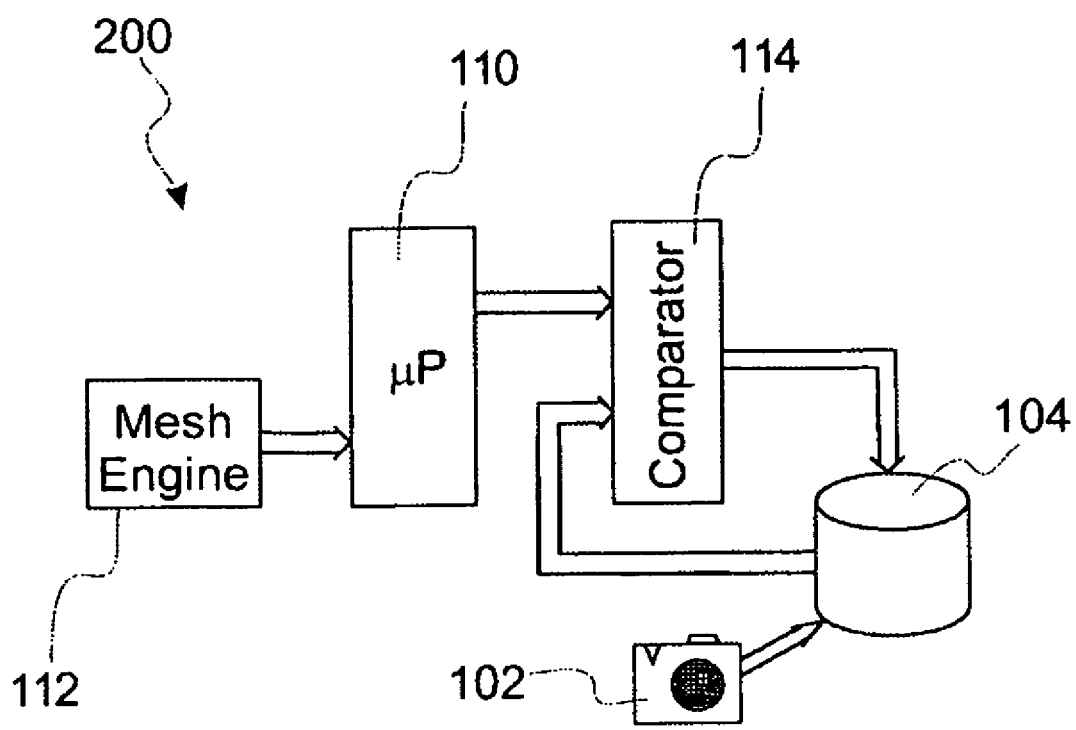
FIG. 2, shows a system according to a second embodiment of the present invention.

FIG. 2 shows a system for adapting a hearing aid to a user, which system is designated in entirety by reference numeral 200. The elements of the system 200 are all described with reference to FIG. 1 and therefore have the same reference numerals as used in said description.

The system 200 comprises a camera 102 for taking one or more pictures of a user's outer ear, which pictures are downloaded to a storage device 104 and associated with a model of a hearing aid.

A processor 110 utilises the pictures and models in the storage device 104 for composing a three-dimensional image of the outer ear having a desired hearing aid positioned in the ear canal.

A mesh engine 112 generates a mesh of the image comprising a plurality of boundary elements, and the processor 110 utilises this mesh for performing a numerical analysis calculating an acoustic response of the outer ear. Following the calculation of the acoustic response of the outer ear the processor 110 identifies in which microphone position the hearing aid provides the optimum solution for the user. The processor 110 forwards data, which describes acoustic response to one or more frequencies at a specific position in the mesh, to a comparator unit 114 comparing the data for the specific position with the presently best known optimum position of the microphone stored in the storage device 104.

Figure 3:
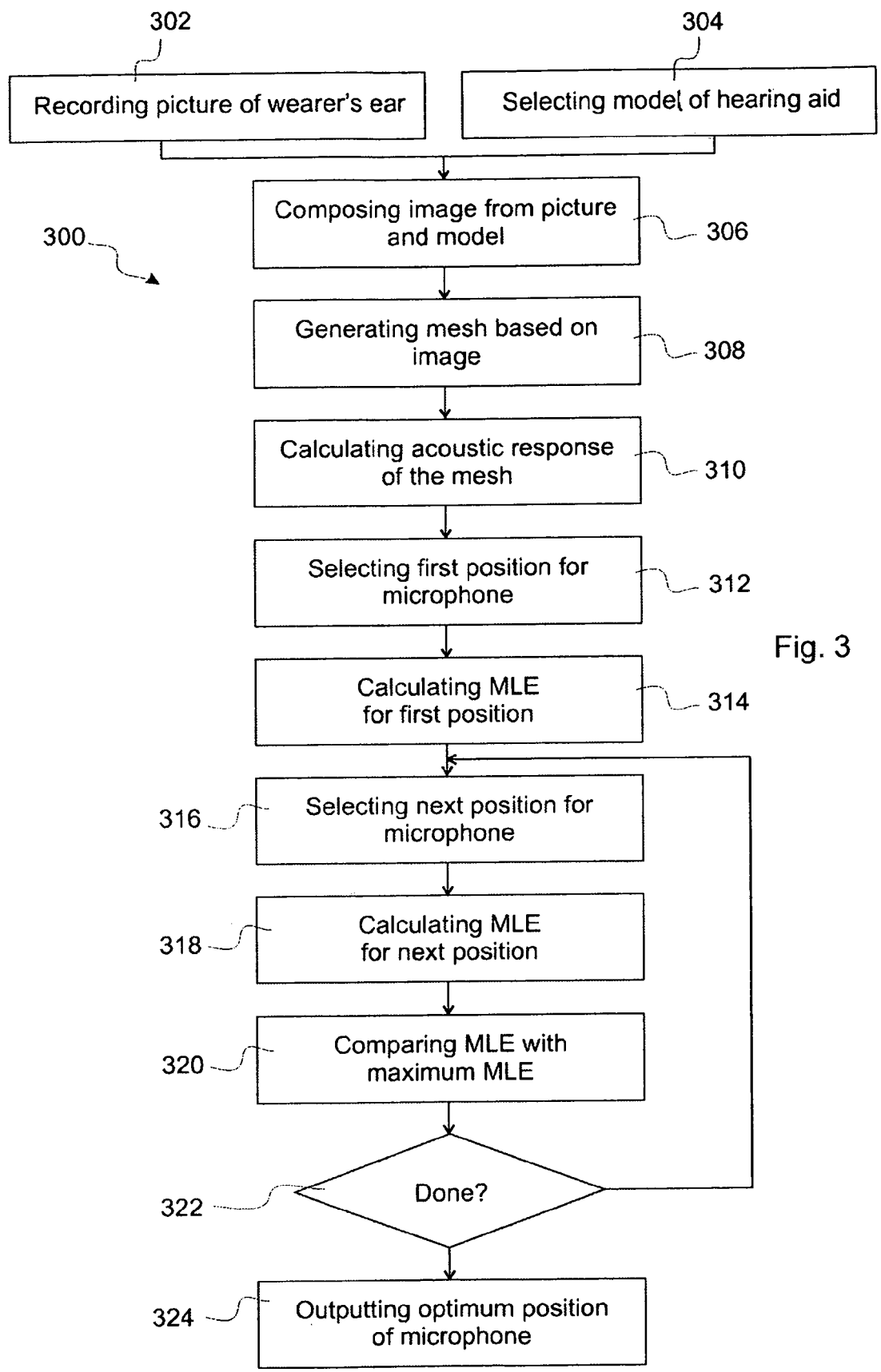
FIG. 3, shows a flow chart of a method according to the third embodiment of the present invention.

FIG. 3 shows as flow chart of a method according to a third embodiment of the present invention, which method is designated in entirety by reference numeral 300.

The method 300 comprises concurrent steps for recording a picture of user's ear 302 and selecting model of hearing aid 304 during which the outer ear of the user and the model of the hearing aid are selected. When the picture of the user's ear and the model has been selected a three-dimensional image is composed 306 and, subsequently, the image is meshed 308 so as to provide a basis for a numerical analysis performed during calculating acoustic response 310.

When the calculations for each element in the mesh are within an acceptable asymptotic deviation (e.g. threshold or stop-criterion ($\epsilon$)) a first position for microphone is selected 312 and a first microphone location effect (MLE) calculation 314 performed for a predefined frequency band. This first MLE calculation may serve as initial reference for the optimisation process of the method.

A next position for microphone is then selected 316 and the MLE calculated 318 for the next position. The MLE calculated for the next position is compared 320 with presently known best position for the microphone, and in case the next position is better then the presently known best position for the microphone is overwritten by the next position.

The method 300 is done 322 when no further positions of the microphone are possible and the optimum position of the microphone is outputted 324 so as to provide the manufacturer with the optimum position of the microphone for the particular user desiring a particular hearing aid.

The invention claimed is:

1. A system for adapting a hearing aid to a user, the system comprising:
    an image generating device configured to generate an image of said user's ear together with a model of said hearing aid, wherein said model of said hearing aid in-situ comprises a physical model of the hearing aid inserted in the user's ear prior to generating said image;
    a mesh generator generating a mesh based on said image;
    a processor configured to calculate an acoustic response to a simulated acoustic signal in said mesh, wherein
    said processor is configured to calculate a frequency response curve for a fixed position in the mesh,
    said processor is further configured to identify an optimal position of a microphone of said hearing aid in-situ from said acoustic response, and wherein
    said processor comprises a comparator configured to compare the frequency response curve for the fixed position in the mesh with a maximum frequency response curve for the mesh stored in a storage memory.

2. The system according to claim 1, further comprising:
    the storage memory configured to store said image, the acoustic response in said mesh, the optimal position of said microphone, and/or the user's audiogram.

3. The system according to claim 1, wherein
    said image generating device comprises a camera or scanner configured to record a picture of the user's ear.

4. The system according to claim 1, wherein
said image is a three dimensional model of an outer ear with the hearing aid inserted in the ear-canal.

5. The system according to claim 1, wherein
said mesh generator comprises a numerical meshing engine.

6. The system according to claim 1, wherein
said simulated acoustic signal comprises a plurality of frequencies having a plurality of sound pressure levels.

7. The system according to claim 1, wherein
said processor is further configured to present a picture of frequency response of the user's ear with the hearing aid in-situ.

8. The system according to claim 1, wherein
said frequency response curve is normalized relative to a low frequency sound pressure level or relative to a sound pressure level of said simulated acoustic signal.

9. The system according to claim 1, wherein
said comparator is further configured to replace the maximum frequency response curve with the frequency response curve for the fixed position when the frequency response curve for the fixed position is greater than the maximum frequency response curve.

10. The system according to claim 1, wherein
said frequency response curve comprises a microphone location effect curve.

11. A method for adapting a hearing aid to a user and comprising:
(a) generating an image of said user's ear together with a model of said hearing aid, wherein said model of said hearing aid in-situ comprises a physical model of the hearing aid inserted in the user's ear prior to generating said image,
(b) generating a mesh based on said image,
(c) calculating an acoustic response to a simulated acoustic signal in said mesh, including calculating a frequency response curve for a fixed position in the mesh, and
(d) identifying an optimal position of a microphone of said hearing aid in-situ from said acoustic response, by comparing the frequency response curve for the fixed position in the mesh with a stored maximum frequency response curve for the mesh.

12. The method according to claim 11, further comprising:
storing in a memory said image, the acoustic response in said mesh, said optimal position of said microphone, and/or the user's audiogram.

13. The method according to claim 11, wherein said generating the image includes:
recording a picture of the user's ear with a camera or a scanner.

14. The method according to claim 11, wherein
said image is a three dimensional model of an outer ear with the hearing aid inserted in the ear-canal.

15. The method according to claim 11, wherein
said generating the mesh is performed on a numerical meshing engine.

16. The method according to claim 11, wherein
said simulated acoustic signal includes a plurality of frequencies having a plurality of sound pressure levels.

17. The method according to claim 11, wherein
said frequency response curve is normalized relative to a low frequency sound pressure level or relative to a sound pressure level of said simulated acoustic signal.

18. The method according to claim 11, further including:
replacing the maximum frequency response curve with the frequency response curve for the fixed position when the frequency response curve for the fixed position is determined to be greater than the maximum frequency response curve in said comparing.

19. The method according to claim 11, wherein
said frequency response curve comprises a microphone location effect curve.

20. A computer-readable non-transitory tangible recording medium encoded with instructions, wherein the instructions, when executed on a processor, cause the processor to perform a method for adapting a hearing aid to a user, the method comprising:
generating an image of said user's ear together with a model of said hearing aid, wherein said model of said hearing aid in-situ comprises a physical model of the hearing aid inserted in the user's ear prior to generating said image;
generating a mesh based on said image;
calculating an acoustic response to a simulated acoustic signal in said mesh, including calculating a frequency response curve for a fixed position in the mesh; and
identifying an optimal position of a microphone of said hearing aid in-situ from said acoustic response, by comparing the frequency response curve for the fixed position in the mesh with a stored maximum frequency response curve for the mesh.

* * * * *